May 4, 1965
J. D. HALE
3,181,635
PORTABLE WEIGHING SCALE
Filed Jan. 8, 1964
2 Sheets-Sheet 1
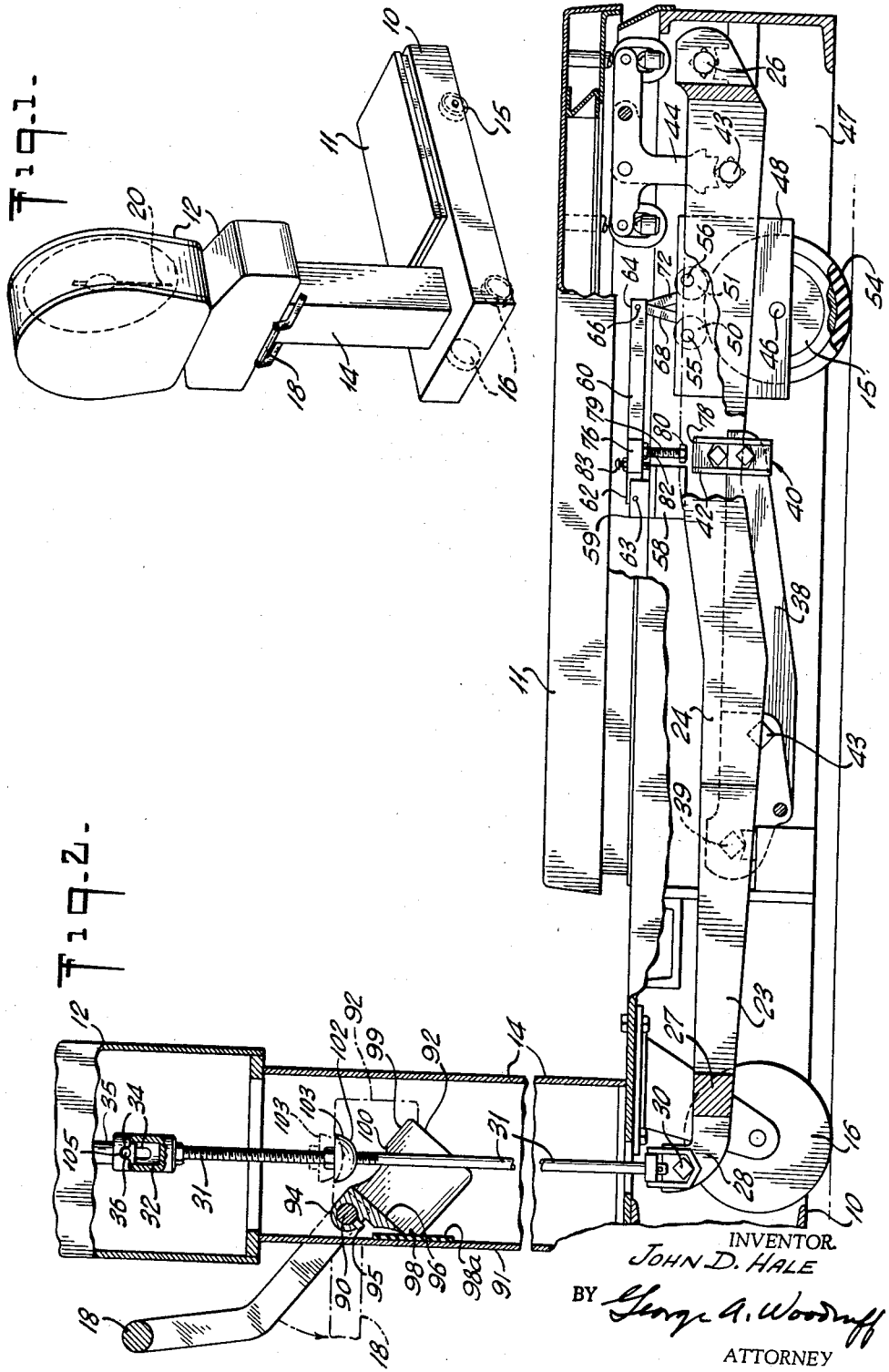
INVENTOR.
JOHN D. HALE
BY George A. Woodruff
ATTORNEY

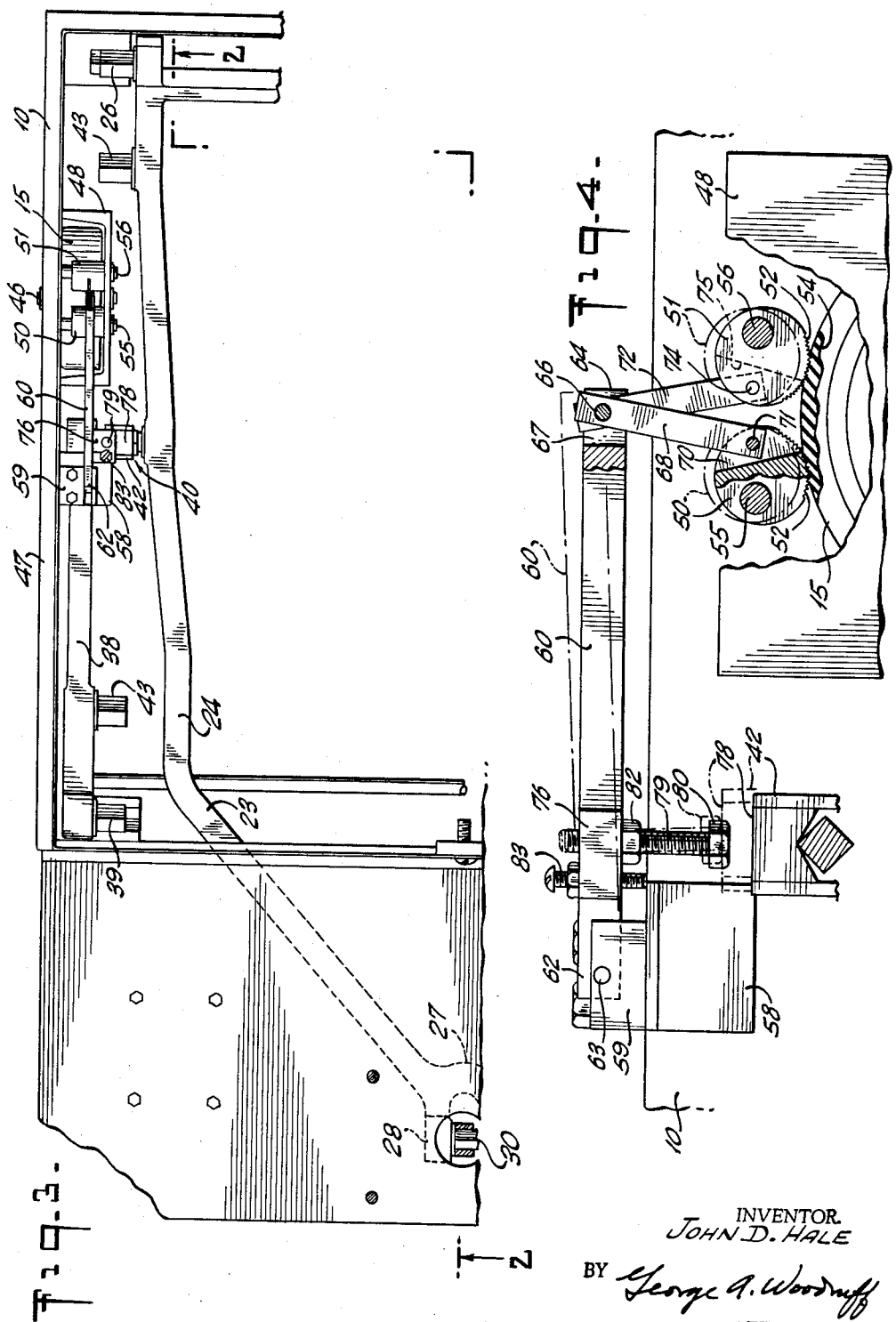

United States Patent Office 3,181,635
Patented May 4, 1965

3,181,635
PORTABLE WEIGHING SCALE
John D. Hale, St. Johnsbury, Vt., assignor, by mesne assignments, to Fairbanks Morse Inc., New York, N.Y., a corporation of Delaware
Filed Jan. 8, 1964, Ser. No. 336,455
12 Claims. (Cl. 177—264)

This invention relates to portable type weighing equipment, and more particularly concerns improvements in wheel brake means for portable wheel-mounted weighing scales.

An object of the invention is to provide for wheel-mounted weighing scales having a lever type weight-receiver supporting system, an improved wheel brake arrangement affording positive wheel braking during scale weighing operations and wherein brake release to permit scale movement from one place to another, is effected through brake release actuating means which includes the scale lever system as an operating part thereof.

Another object resides in the provision in a portable weighing scale of the character above indicated and which includes a weight indicator on a scale mounted standard or column and a steelyard rod connecting the weight-receiver lever system to the indicator, of a wheel brake normally in wheel braking engagement and including brake releasing means operable by the lever system in elevation thereof beyond its no-load weighing position, and a scale moving handle conveniently located on the indicator column and movable from an inactive position to a scale moving position, wherein the handle in movement to the latter position coacts with the steelyard to determine brake release effecting elevation of the lever system.

A further object is to provide a wheel brake for weighing scales of the character indicated, wherein the brake mechanism includes at least a pair of eccentrically mounted movable brake members arranged relative to an associated wheel for gravity-biased braking engagement therewith and such that one brake member is effective to prevent wheel turning in one direction while the other brake member effectively prevents wheel turning in the opposite direction.

The foregoing and other objects and advantages of the present invention will appear from the following description of a presently preferred embodiment thereof as such is illustrated in the accompanying drawing, wherein:

FIG. 1 illustrates in perspective elevation a portable dial indicator type platform weighing scale to which the present improvements are applicable;

FIG. 2 is an enlarged longitudinal sectional view of the scale illustrating the presently improved wheel brake arrangement therein, the view being along line 2—2 in FIG. 3;

FIG. 3 is a plan view in section of a portion of the scale, as shown by FIG. 2 showing certain details of the invention, and FIG. 4 is an enlarged fragmentary longitudinal section of the scale in the region of a wheel and associated brake.

With reference now to the drawing, the present improvements are particularly suitable for application to a portable platform type scale such as that shown by FIG. 1. As there illustrated, the scale structure includes a frame 10, weight-receiver platform 11 supported by the scale lever system within the frame (see FIGS. 2 and 3 hereinafter to be described), a dial type weight indicator assembly 12 supported on a standard or column 14 mounted on one end of the frame 10, and sets of scale transport wheels 15 and 16 suitably journalled in the frame. A scale moving handle 18 is provided on the column 14 in convenient location thereon the handle being pivotal and shown in its inactive up position. Manual grasp of the handle and movement thereof downwardly to a position facilitating moving of the scale from one location to another, effects release of wheel braking mechanism hereinafter to be described. Indicator assembly 12 contains suitable load-responsive mechanism (not shown) operating a visual pointer 20 over a graduated dial scale (not shown).

The scale lever system which supports platform 11 may be of conventional character. Referring to FIGS. 2 and 3, the lever system includes a double arm long lever 23 each arm 24 of which (only one arm shown in full) is pivotally supported from the frame 10 by the pivot assembly 26. The arms are joined at 27, and extending from the juncture is the output end portion or nose 28 of the lever which terminates below the indicator column 14. Pivoted to the lever nose at 30 is a steelyard rod 31 which extends upwardly through column 14 to operative connection with the indicator mechanism for actuation thereof in providing weight indication by pointer 20.

In the present embodiment and as shown in FIG. 2, the rod 31 at its upper end carries a hollow fitting 32 having opposite longitudinal slots one being shown at 34. The lower end of a mechanism actuating link 35 is received in fitting 32 and supports a transverse pin 36 extending into the slots 34. This provides a lost motion connection for a purpose to appear hereinafter.

Returning to the scale lever system, associated with each arm of the long lever is a short lever 38 (only one being shown) having one end pivotally supported by the frame as at 39. Connecting the other end of the short lever to the long lever arm 24 is a knife-edge type pivotal connection assembly generally indicated at 40 which includes a stirrup member 42. The long and short levers carry platform mounting studs 43 engaged by leg assemblies, such as that shown at 44 in FIG. 2, on the platform 11.

As appears in FIGS. 2 and 3 each wheel 15 (only one shown here) has its axle 46 supported by the scale frame side member 47 and a bracket 48 suitably mounted on the inner side of member 47. Associated with the wheel 15 shown is a presently improved brake mechanism, it being noted as a preference here that the opposite wheel 15 not shown in these views, is also provided with an identical brake mechanism. The brake comprises a pair of brake rollers 50 and 51 each preferably of hardened steel and having the peripheral surface thereof knurled, as at 52 (FIG. 4) for braking co-operation with the wheel tread 54 which is of rubber or other suitable resilient material. Roller 50 is mounted eccentrically on a stud or axle element 55 freely rotatably journalled in the frame side member 47 and bracket 48, in a position above the wheel tread 54 such that the roller is gravity-biased in a clockwise direction as viewed in FIGS. 2 and 4 to braking engagement with the wheel tread. In such braking engagement, the knurled roller surface tends to bite into the wheel tread, and any tendency of the wheel to turn counter-clockwise will result in wedging of the roller between the wheel tread and the roller axle 55, thereby locking the wheel against such turning. Roller 51 is similarly eccentrically mounted on a stud or axle 56 but in a position for gravity-biased rotation in the counter-clockwise direction, to wheel braking engagement. Here, any tendency for clockwise wheel turning will result in roller wedging against the wheel tread to lock the wheel from turning.

Secured to the inside of scale frame side member 47 and adjacent the stirrup 42 is a bracket 58 supporting a block 59, the block being elevated relative to the stirrup 42 and located at the side thereof opposite that facing the brake rollers. A brake control member or arm 60 has one end 62 freely pivoted at 63 to the block 59, and extends generally parallel to side member 47 to a zone above the brake rollers. The free end 64 of the arm intersects a vertical plane midway between the eccentric axes of the rollers 50 and 51, and at such intersection supports a pivot pin 66 spanning slot 67 (FIG. 4) in the arm end. Pivotally mounted on pin 66 in slot 67 is a link 68 which depends from the arm to pivotal connection with brake roller 50, the lower end of the link being received in a slot 70 formed in the eccentric over-hang portion of the roller and pivotally attached to the roller as by a suitable pivot pin 71. A second link 72 is in like pivotal connection between the arm pin 66 and a pin 74 in slot 75 of the roller 51. Secured to brake arm 60 is a bracket 76 projecting laterally therefrom in substantially overlying relation to the upper end 78 of the lever system stirrup 42. In threaded connection to bracket 76 is a stud 79 which depends therefrom with the stud end or head 80 facing the stirrup end 78. FIG. 2 illustrates the scale lever system in normal no-load position, and with the stirrup 42 then positioned as shown, the stud 79 is threadedly adjusted and maintained by lock nut 82 such that the stud head 80 will be in desirable minimum clearance above the stirrup top end 78 when the brake arm 60 is in lowered position allowing full gravity-biased braking engagement of the rollers 50 and 51 with the wheel tread. Such lowered position of the brake arm is here determined by an adjustable screw 83 carried by arm bracket 76 and abutting the frame bracket 58. The screw 83 also facilitates arm adjustment to remove any unwanted slack or play in the brake mechanism, so that only a relatively small extent of pivotal elevation of arm 60 will rock the rollers 50 and 51 upwardly out of braking contact with the wheel (as to the broken line positions shown in FIG. 4).

In normal weighing operation the lever system moves downwardly under platform loading, so that there is no interference by the brake arm stud 79 with the stirrup 42 in its weighing function movement to and from the no-load position shown in FIG. 2. At such time the portable scale is fully braked against movement, the brake mechanism at each wheel 15 then being free for gravity-biased engagement of the brake rollers with the wheel. However, upon elevation of the lever system from the no-load position, the upper end 78 of stirrup 42 will engage the head 80 of stud 79 and effect through the stud, pivotal elevation of brake arm 60. The resulting upward pivoting of the brake arm thereby effects through the links 68 and 72, eccentric movement or rocking of the brake rollers 50 and 51 upwardly to positions clear of braking contact with the wheel. The portable scale then is free to be moved.

As hereinbefore indicated the scale is provided with the handle 18 for facilitating manual movement of the scale from place to place. According to the present improvements, such handle serves also to control brake release actuation of the lever system and return thereof to normal weighing condition wherein the wheel brakes are in applied condition. Referring to FIG. 2 the handle 18 is suitably secured to a shaft 90 projecting horizontally in the column 14 and suitably rotatably journalled in opposite wall portions of the column. Shaft 90 which is adjacently parallel to one wall 91 of the column structure, supports a block-form weight member 92, the member having an extension 94 at one end received on the central portion of the shaft and suitably connected thereto as by the pin connection 95. The weight member thus extends in the column in cantilever manner from the shaft 90, and is centrally slotted at 96 to accommodate the steelyard rod 31 freely therethrough. Due to its eccentric or cantilever position on shaft 90, the weight member tends at all times to pivot downwardly under gravity-bias, to its lowermost position having the abutment portion 98 thereof engaging the wall 91 of the column. In such position the weight actuates the handle 18 to its inactive, up position shown in FIG. 1. If desired a resilient pad 98a may be located on wall 91 to absorb the shock of weigh contact with the wall.

Formed in the top side 99 of member 92 is a curved depression 100 forming an engagement seat for the curved undersurface 102 of an abutment element 103 suitably fixed on the steelyard rod 31. Abutment 103 is positional on the rod so that when the handle 18 is grasped and pulled downwardly to a position convenient for moving of the scale from one place to another, the resulting pivotal elevation of the weight member 92 brings its seat 100 into engagement with abutment 103, producing through the abutment a lifting displacement of the steelyard rod 31 beyond its normal range of elevation in weighing operation. Such lifting of the rod thereby produces the before described elevation of the lever system above its no-load position, to effect release of the wheel brakes. Manual release of the handle 18 with consequent automatic handle return to its inactive position, under downward movement of the weight member 92, thereby releases the steelyard rod and lever system for return to the no-load positions wherein the wheel brakes are applied and the scale is in condition for weighing operations.

The handle effected elevation of the steelyard rod 31 to release the wheel brakes is here employed also, to relieve the indicator mechanism of indicator 12 from load connection with the scale lever system, whereby to prevent possible damage to the indicator during moving of the scale from place to place. In weighing condition of the scale, pin 36 (FIG. 2) engages the top ends of slots 34 (as the top end 105 shown) thus coupling the rod and link for lever system actuation of the indicator. Now when the handle 18 is depressed, the resulting elevation of rod 31 displaces the fitting 32 to free the pin 36 from the top ends of the slots. This uncouples link 35 from rod 31 and thereby removes the lever system load from the indicator. It also permits the indicator mechanism to come to rest on limit stops (not shown) behind the no-load position of the indicator, such limit stops being conventional in dial type indicator mechanisms.

Having now described the illustrated presently preferred embodiment of the invention, it will appear that the present improvements afford an effective wheel brake arrangement wherein the scale lever system is included as a direct operating part of the brake control mechanism. Further, the improvements provide for brake control from the scale moving handle acting through the steelyard rod connection to the indicator, and coincidentally through the latter, control of the indicator mechanism such as to effect load-relief thereof during scale movements from place to place.

It is to be understood of course that while a preferred embodiment is here presented, alterations and modifications may be made therein without departing from the scope of the invention hereinafter claimed.

What is claimed is:

1. In a portable platform weighing scale, a frame, supporting wheels on the frame, a platform lever system carried by the frame, a weight indicator, indicator mounting means on the frame, a steelyard rod operatively connecting the lever system to said indicator, a scale moving handle on said mounting means movable from an inactive position to a scale moving position, wheel brake means normally in braking engagement with one of said wheels, means operated by said handle in movement to scale moving position for actuating said rod to move the lever system in one direction, and means operable in response to said lever system movement for releasing said wheel brake means from wheel engagement.

2. In a portable platform weighing scale, a frame, supporting wheels on the frame, a platform lever system carried by the frame, a weight indicator, indicator mounting means on the frame, a steelyard rod operatively connecting the lever system to said indicator, a scale moving handle on said mounting means movable from an inactive position to a scale moving position, wheel brake means normally in braking engagement with one of said wheels, means operated by said handle in movement to scale moving position for actuating said rod to move the lever system in one direction, and operating means between said brake means and said lever system actuated by the latter in said movement thereof, to release the wheel brake means from wheel engagement.

3. In a portable platform weighing scale, a frame, supporting wheels on the frame, a platform lever system carried by the frame, a weight indicator, indicator mounting means on the frame, a steelyard rod operatively connecting the lever system to said indicator, a scale moving handle on said mounting means normally in an inactive position and movable therefrom to a scale moving position, wheel brake means normally in braking engagement with one of said wheels, means biasing said handle to said inactive position and operable by the handle in movement to scale moving position for actuating said rod to move the lever system in one direction, and operating means between said brake means and the lever system actuated by the latter in said movement thereof, to release the brake means from wheel engagement.

4. In a portable platform weighing scale, a frame, supporting wheels on the frame, a platform lever system carried by the frame, a weight indicator, indicator mounting means on the frame, a steelyard rod operatively connecting the lever system to the indicator, an abutment on said rod, a scale moving handle on said mounting means normally in an inactive position and movable therefrom to a scale moving position, weight means biasing said handle to said inactive position and movable by the handle in movement to scale moving position, to engagement with said rod abutment for actuating the rod to move the lever system in one direction, wheel brake means normally in braking engagement with one of said wheels, and means operated in response to said lever system movement in one direction to release the brake means from wheel engagement.

5. In a portable platform weighing scale, a frame, supporting wheels on the frame, a platform lever system carried by the frame, a weight indicator, indicator mounting means on the frame, a steelyard rod operatively connecting the lever system to the indicator, a scale moving handle on said mounting means normally in an inactive position and movable therefrom to a scale moving position, means biasing said handle to its inactive position and adapted for actuating said rod in response to handle movement to scale moving position, to move the lever system in one direction, wheel brake means normally gravity biased to braking engagement with one of said wheels, and operating means between the brake means and said lever system actuated by the latter in said one direction movement thereof, to release the brake means from wheel engagement.

6. In a portable platform weighing scale, a frame, supporting wheels on the frame, a platform lever system carried by the frame including a long lever, a short lever and a connection therebetween, a weight indicator, indicator mounting means on the frame, a steelyard rod operatively connecting said long lever to said indicator, a scale moving handle on said mounting means normally in an inactive position and movable therefrom to a scale moving position, means operated by the handle in movement to scale moving position for lifting said rod and thereby lifting said long lever to displace said connection to an elevated position, wheel brake means normally in braking engagement with one of said wheels, and means responsive to displacement of said connection to said elevated position for releasing said brake means from wheel engagement.

7. In a portable platform weighing scale according to claim 6 wherein the said wheel brake means comprises a pair of braking members on the frame adapted and arranged for gravity biased braking engagement with the said one wheel.

8. In a portable platform weighing scale, a frame, supporting wheels on the frame, a platform lever system carried by the frame including a long lever, a short lever and a connection therebetween, a weight indicator, indicator mounting means on the frame, a steelyard rod operatively connecting the long lever to said indicator, a scale moving handle on said mounting means normally in an inactive position and movable therefrom to a scale moving position, means operated by the handle in movement to scale moving position for lifting said rod and thereby lifting said long lever to displace said connection to an elevated position, brake means on the frame normally in braking engagement with one of said wheels, a brake arm movably carried on said frame and connected to said brake means, and an abutment on said arm overlying said connection for engagement thereby in displacement of the connection to said elevated position, to move the brake arm for releasing the brake means for wheel engagement.

9. In a portable platform weighing scale according to claim 8 wherein the said brake means comprises a pair of braking members on the frame adapted and arranged for gravity biased braking engagement with said one wheel.

10. In a portable weighing scale including a frame, frame supporting wheels and a scale lever system carried by the frame, frame supported brake means for at least one of said wheels, said brake means being movable and normally biased to braking engagement with the wheel, and means including said scale lever system operable for effecting movement of said brake means away from wheel braking engagement.

11. In a portable weighing scale including a frame, frame supporting wheels, and a scale lever system carried by the frame, releasable brake means for at least one of said wheels, said brake means comprising a first roller member eccentrically mounted on the frame and normally gravity-urged to wheel engagement effective for braking the wheel against wheel rotation in one direction, a second roller member eccentrically mounted on the frame and normally gravity-urged to wheel engagement effective for braking the wheel against wheel rotation in the opposite direction, a brake arm movably carried by the frame, link means connecting the brake arm to said roller members, said brake arm in one position freeing said roller members for wheel braking engagement and in movement from said one position effecting eccentric displacement of the roller members from wheel engagement, and means including the scale lever system operable for effecting movement of the brake arm from said one position.

12. In a portable weighing scale, a frame, frame supporting wheels, a platform lever system in the frame having a normal range of depression and elevation movement in weighing operation and capable of elevation above said range, a weight indicator including an operating element, indicator mounting means on the frame, a steelyard rod for connecting the lever system to said indicator for weight indicating operation thereof in the normal range of lever system movement, a lost-motion connection between said rod and said indicator operating element, said rod having an abutment thereon and being capable of an extent of movement in one direction corresponding to said elevation of the lever system, the rod in movement thereof in said one direction, operating said lost-motion connection to render said indicator inoperative, brake means normally in braking engagement with at least one of said wheels, means responsive to said elevation of the lever system for releasing the brake means from wheel braking engagement, a scale moving handle on said mounting means movable from an inactive position to a scale moving position, and handle operated means engageable with said rod abutment in handle movement to scale moving position for effecting said movement of the rod, thereby to operate said lost-motion connection to render the indicator inoperative and to effect said elevation of the lever system releasing the brake means from wheel braking engagement.

References Cited by the Examiner
UNITED STATES PATENTS

| | | | |
|---|---|---|---|
| 835,460 | 11/06 | Noble | 188—30 |
| 2,673,729 | 3/54 | Murray | 177—140 |

LEYLAND M. MARTIN, *Primary Examiner.*